US009705118B2

(12) United States Patent
Li

(10) Patent No.: US 9,705,118 B2
(45) Date of Patent: Jul. 11, 2017

(54) METHOD FOR PREPARING SEPARATOR OF BATTERY

(75) Inventor: Ruiling Li, Guangdong (CN)

(73) Assignee: GUANGDONG POWERLINK ENERGY CO., LTD., Guangdong (CN)

( * ) Notice: Subject to any disclaimer, the term of this patent is extended or adjusted under 35 U.S.C. 154(b) by 877 days.

(21) Appl. No.: 13/995,263

(22) PCT Filed: Jun. 15, 2012

(86) PCT No.: PCT/CN2012/076968
§ 371 (c)(1),
(2), (4) Date: Jun. 18, 2013

(87) PCT Pub. No.: WO2012/174998
PCT Pub. Date: Dec. 27, 2012

(65) Prior Publication Data
US 2013/0319601 A1   Dec. 5, 2013

(30) Foreign Application Priority Data

Jun. 22, 2011 (CN) .......................... 2011 1 0169854

(51) Int. Cl.
H01M 2/16 (2006.01)
H01M 2/14 (2006.01)
B32B 27/08 (2006.01)
B32B 27/32 (2006.01)
H01M 2/18 (2006.01)

(52) U.S. Cl.
CPC .......... *H01M 2/1653* (2013.01); *B32B 27/08* (2013.01); *B32B 27/32* (2013.01); *H01M 2/145* (2013.01); *H01M 2/1686* (2013.01); *H01M 2/18* (2013.01); *B32B 2255/10* (2013.01); *B32B 2255/24* (2013.01); *B32B 2307/308* (2013.01); *B32B 2307/516* (2013.01); *B32B 2307/54* (2013.01); *B32B 2307/706* (2013.01); *B32B 2307/718* (2013.01); *B32B 2307/724* (2013.01); *B32B 2307/728* (2013.01); *B32B 2457/10* (2013.01); *Y10T 156/1002* (2015.01)

(58) Field of Classification Search
CPC .. H01M 2/145; H01M 2/1653; H01M 2/1686; B01D 67/0088
See application file for complete search history.

(56) References Cited

U.S. PATENT DOCUMENTS 3,843,761 A    10/1974  Bierenbaum
3,853,601 A *  12/1974  Taskier ............... H01M 2/1653
                                                    428/315.7
4,279,978 A     7/1981  Dodin
5,667,911 A *   9/1997  Yu ........................... B29C 55/06
                                                       29/623.1
5,804,625 A *   9/1998  Temperante ........... A61L 15/24
                                                        524/188
6,488,721 B1 * 12/2002  Carlson ............... H01M 2/1673
                                                        29/623.5
2009/0134538 A1* 5/2009 Takita ................. B29C 47/0021
                                                         264/28

FOREIGN PATENT DOCUMENTS

CN    1134043      10/1996
CN    1400235      3/2003
CN    102263220    11/2011
JP    63072063     4/1988

OTHER PUBLICATIONS

PCT International Search Report dated Sep. 27, 2012, PCT Patent Application No. PCT/CN2012/076968.
PCT Written Opinion of the International Searching Authority dated Sep. 27, 2012, PCT Patent Application No. PCT/CN2012/076968.
English Translation of Abstract of Chinese Patent Application No. CN1134043.
English Translation of Abstract of Chinese Patent Application No. CN1400235.
English Translation of Abstract of Chinese Patent Application No. CN102263220.
English Translation of Abstract of Japanese Patent Application No. JP63072063.

* cited by examiner

*Primary Examiner* — Matthew Daniels
*Assistant Examiner* — Marta Dulko
(74) *Attorney, Agent, or Firm* — Vierra Magen Marcus LLP

(57) ABSTRACT

A method for preparing a separator of a battery comprises the steps of: respectively stretching a first polypropylene film and a second polypropylene film in one direction at −3-7° C., and keeping at 45-60° C. to provide a first polypropylene microporous film and a second polypropylene microporous film; perpendicularly compounding the films along the stretching direction to provide a polypropylene microporous composite film; and subjecting the polypropylene microporous composite film to hydrophilic treatment to provide the separator of the battery. The through micro-pores in the first and the second polypropylene film in the invention are attached and staggered to form tortuous pores, which greatly reduce the aperture of the through pores. Therefore, the passing of fine zinc particles and zincate can be blocked without influence on the passing of organic ions and the penetration of dendritic crystals is avoided.

7 Claims, 2 Drawing Sheets

METHOD FOR PREPARING SEPARATOR OF BATTERY

FIELD OF THE INVENTION

The present invention relates to the technical field of membrane separator, and in particular, to a method for preparing a membrane separator of a battery.

BACKGROUND OF THE INVENTION

In recent years, with the emerging of the problems such as the depletion of natural resources and the warming of the global weather, the green and low carbon life style is becoming popular. Replacing some of internal combustion engine vehicles consuming fossil fuel by electric vehicles and hybrid electric vehicles is one of the main solutions dealing with the energy crisis and environmental deterioration. The driving source is a key component affecting the promotion and use of an electric vehicle. The driving sources widely used at present include lead acid batteries, nickel-cadmium batteries (NiCd), lithium ion batteries, nickel-zinc batteries and the like. In various driving sources, nickel-zinc batteries are widely researched due to the advantages of high power, sufficient energy, free of environmental pollution, high reliability and safety, low cost, and long service life.

In nickel-zinc batteries, due to the problems of tendency to deformation, dendritic crystal, corrosion, and passivation present in zinc electrodes, a nickel-zinc battery suffers from the disadvantages of short cycling life, high self-discharging, and rapid capacity fading during cycling use. Continuous researches were made by relevant researchers on the membrane separator of the nickel-zinc battery in order to overcome the above defects existing in the nickel-zinc battery. For example, Andre H. Bull. Soc. Fr. Electrians published in 1941 reported a membrane separator, which is unstable and tends to degrade in 30% KOH solution; and U.S. Pat. No. 4,279,978 reported a membrane separator consisted of polyamide, hydrophilic polymer, and some auxiliary materials.

However, the common disadvantage present in both of the above reported membrane separators lies in that the micro-pores in the membrane separator are straight pores, as shown in FIG. 1. Since ions, which have the characteristic of moving along a line, preferably choose micro-pores having smaller resistance, zinc ions are preferably reduced and repeatedly accumulated at the straight pores during charging, so that zinc material is gradually increased at straight pores to form an elevated point higher than the electrode plane, that is, zinc dendrite. Dense and hard zinc dendrite will continue to grow, and penetrate the membrane separator from the micro-pores of the membrane separator, leading to short circuit between the electrodes of the nickel-zinc battery and in turn failure of the battery.

Therefore, the present inventor proposes a method for preparing a battery membrane separator that can be prevented from being penetrated by dendrites.

SUMMARY OF THE INVENTION

Correspondingly, the technical problem to be resolved by the present invention is to provide a method for preparing a membrane separator of a battery, and the prepared membrane separator can be avoided of being penetrated by dendrites.

The present invention provides a treating solution for a membrane separator of a battery, including the following components by weight percentage:

1.85 wt %~2 wt % fluoro-carbon surfactant;
1.3 wt %~1.5 wt % leveling agent;
1.4 wt %~1.7 wt % non-ion surfactant; and
95 wt %~95.4 wt % water.

Correspondingly, the present invention further provides a method for preparing a treating solution for a membrane separator of a battery, including the steps of:

adding 1.4 wt %~1.7 wt % non-ion surfactant to 95 wt %~95.4 wt % water, and mixing to provide a first solution; and separately adding 1.85 wt~2 wt % fluoro-carbon surfactant and 1.3 wt %~1.5 wt % leveling agent to the first solution, and mixing to provide the treating solution for the membrane separator of the battery.

The present invention further provides a method for preparing a membrane separator of a battery, including the steps of:

separately drawing a first polypropylene film and a second polypropylene film in one direction at −3~−7° C., and keeping at 45~60° C. to provide a first polypropylene microporous film and a second polypropylene microporous film;

perpendicularly compounding the polypropylene microporous film and the second polypropylene microporous film along the drawing direction to provide a polypropylene microporous composite film; and subjecting the polypropylene microporous composite film to hydrophilic treatment to provide the membrane separator of the battery.

Preferably, the step of subjecting the polypropylene microporous composite film to hydrophilic treatment includes: soaking the polypropylene microporous composite film in the treating solution of the membrane separator of the battery for 1-5 hours, and drying, in which the treating solution of the membrane separator of the battery includes the following components by weight percentage: 1.85 wt %~2 wt % fluoro-carbon surfactant; 1.3 wt %~1.5 wt % leveling agent; 1.4 wt %~1.7 wt % non-ion surfactant; and 95 wt %~95.4 wt % water.

Preferably, the polypropylene microporous composite film and the treating solution of the membrane separator of the battery have an area/mass ratio of (30 m$^2$~50 m$^2$):(20 Kg~30 Kg).

Preferably, the polypropylene microporous composite film has a thickness of 0.015~0.10 mm Preferably, the polypropylene microporous composite film has an areal density of 12~43 g/m$^2$, and an air permeability of 35~56%.

Preferably, the polypropylene microporous composite film has an anti-piercing strength of 8~50N.

Preferably, the polypropylene microporous composite film has a longitudinal tensile strength of 1500~1950 kgf/cm$^2$, and a horizontal tensile strength of 300~657 kgf/cm$^2$.

Preferably, the first polypropylene microporous film has a pore size of 7~15 μm; and the second polypropylene microporous film has a pore size of 7~15 μm.

The present invention discloses a method for preparing a membrane separator of a battery, including: separately drawing a first polypropylene film and a second polypropylene film in one direction at −3~−7° C., and keeping at 45~60° C. to provide a first polypropylene microporous film and a second polypropylene microporous film; perpendicularly compounding the polypropylene microporous film and the second polypropylene microporous film along the drawing direction to provide a polypropylene microporous composite film; and subjecting the polypropylene microporous composite film to hydrophilic treatment to provide the membrane separator of the battery. In comparison with the prior art, the present invention perpendicularly compounds the first polypropylene microporous film and the second polypropylene microporous film along the drawing direction, so that the straight micro-pores in the first polypropylene microporous film and those in the second polypropylene microporous film joint in dislocation way to form curved pores, so as to significantly decrease the size of the pores, thereby effectively blocking the passing of fine zinc particles and zincate while allowing the passing of organic ions, and preventing the penetration of dendrites.

BRIEF DESCRIPTION OF THE DRAWING

Technical solutions of the embodiments of the present invention or the prior art will be illustrated more clearly with the following brief description of the drawings. Apparently, the drawings referred in the following description constitute only some embodiments of the invention. Those skilled in the art may obtain some other drawings from these drawings without any inventive labor.

DETAILED DESCRIPTION OF THE INVENTION

Figure 1:
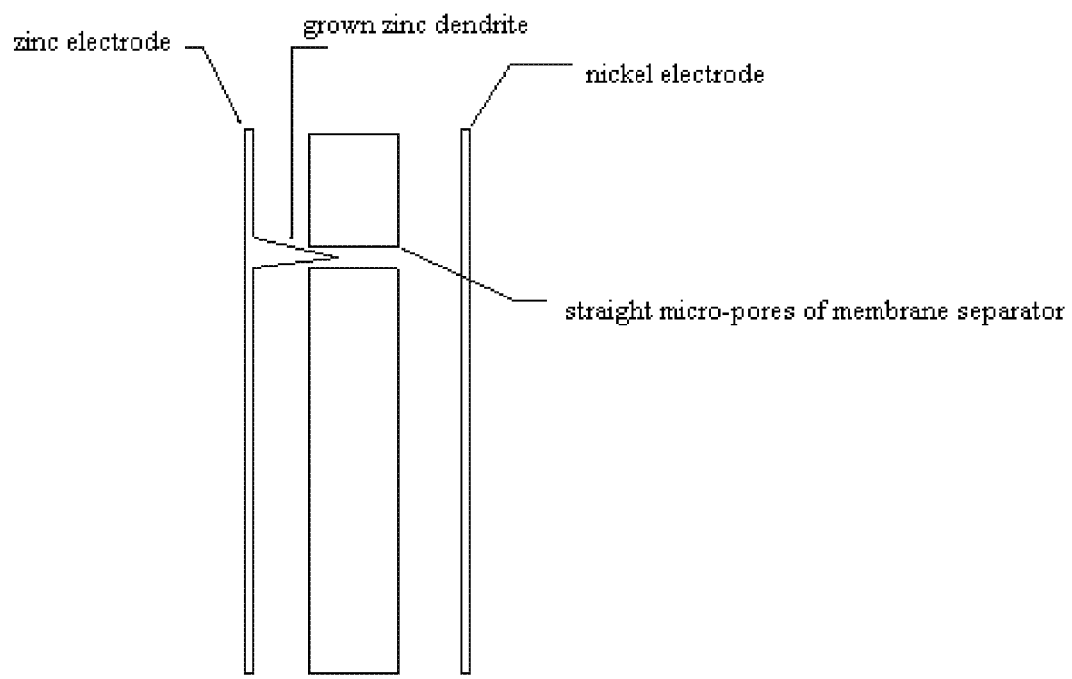
FIG. 1 is the schematically structural view of the membrane separator of a battery in prior art.

The technical solutions of the embodiments of the present invention will be described clearly and completely in conjunction with the drawings. Apparently, the described embodiments are only some rather than all embodiments of the present invention. Any other embodiments obtained from the embodiments of the present invention by those skilled in the art without any inventive labor fall within the scope of the invention.

The present invention discloses a method for preparing a membrane separator of a battery, including the steps of:

separately drawing a first polypropylene film and a second polypropylene film in one direction at −3~−7° C., and keeping at 45~60° C. to provide a first polypropylene microporous film and a second polypropylene microporous film;

perpendicularly compounding the polypropylene microporous film and the second polypropylene microporous film along the drawing direction to provide a polypropylene microporous composite film; and subjecting the polypropylene microporous composite film to hydrophilic treatment to provide the membrane separator of the battery.

The first polypropylene film is preferably prepared by dry uni-directional drawing, and has low degree of crystallinity and high degree of orientation. Preferably, the first polypropylene film has a pore size of 7~15 μm, more preferably 8~14 μm, and most preferably 10~13 μm. The temperature at which the first polypropylene film is uni-directionally drawn is preferably −4~−6° C., and more preferably −5~−6° C.; and the temperature at which the first polypropylene film is kept is preferably 50~60° C., and more preferably 53~58° C.

In the present invention, the second polypropylene film is preferably the same as the first polypropylene film. The temperature at which the second polypropylene film is uni-directionally drawn is preferably −4~−6° C., and more preferably −5~−6° C.; and the temperature at which the second polypropylene film is kept is preferably 50~60° C., and more preferably 53~58° C. The second polypropylene film has a pore size of preferably 7~15 μm, more preferably 8~14 μm, and most preferably 10~13 μm.

Taking the first polypropylene film as an example, it forms small wrinkling defects upon drawing at −3~−7° C., which are then stretched upon being kept at 45–60° C. to form prolate micro-pores. Similarly, since the second polypropylene film is treated by the same method as that for the first polypropylene film, it similarly has the prolate micro-pores.

Since the first polypropylene film and the second polypropylene film are simply drawn in one direction and formed with prolate micro-pores, they have relatively poor horizontal tensile strength. Therefore, the method of the present invention perpendicularly compounds the first polypropylene microporous film and the second polypropylene microporous film along the drawn direction to obtain a polypropylene microporous composite film, in which the first polypropylene microporous film and the second polypropylene microporous film are in staggered position, so that the longitudinal and horizontal tensile strengths of the obtained polypropylene microporous composite film are significantly improved compared with the first polypropylene film and the second polypropylene film before compounding.

Moreover, after perpendicularly compounding the first polypropylene microporous film and the second polypropylene microporous film along the drawn direction, the method of the present invention joints the straight mirco-pores in the first polypropylene microporous film and the second polypropylene microporous film in dislocation way to form curved pores, which significantly reduces the size of the pores, so as to block the pass of fine zinc particles and zincate while allowing the pass of organic ions, thereby avoiding the penetration of dendrites. The polypropylene microporous composite film preferably has a pore size of 1~5 μm, and more preferably 1.5~4 μm.

In the present invention, the perpendicularly compounding of the first polypropylene microporous film and the second polypropylene microporous film along the drawn direction is preferably done by using a rolling device, and more preferably by using a rolling device having a diameter of 4.5~5.5 m and a length of 6.5~7.5 m under heating.

Figure 2:
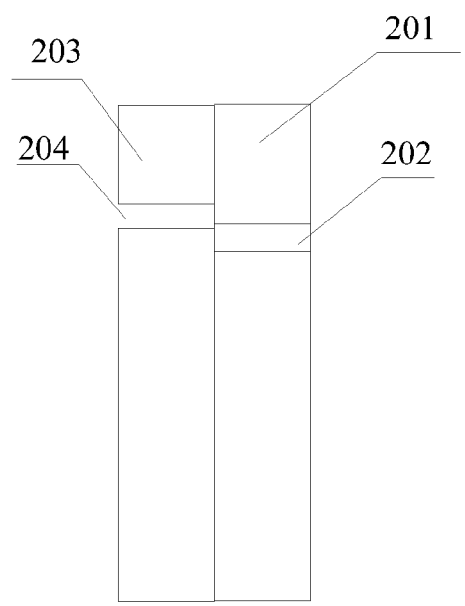
FIG. 2 is the schematically structural view of the membrane separator of a battery disclosed in the present invention.

FIG. 2 is the schematically structural view of the membrane separator of a battery provided by the present invention. It can be seen from FIG. 2 that the first polypropylene microporous film 201 has a first micro-pore 202, and the second polypropylene microporous film 203 has a second micro-pore 204; the first polypropylene microporous film 201 and the second polypropylene microporous film 203 are compounded together so that the first micro-pore 202 and the second second micro-pore 204 are staggered to form a curved pore which has a greatly reduced size in comparison with those of the first micro-pore 202 and the second micro-pore 204.

The polypropylene microporous composite film prepared above has a thickness of preferably 0.015~0.10 mm, and more preferably 0.02~0.08 mm; an areal density of preferably 12~43 g/m², and more preferably 20~40 g/m²; an air permeability of preferably 35~56%, and more preferably 40~55%; an anti-piercing strength of preferably 8~50N, and more preferably 10~30N; a longitudinal tensile strength of preferably 1500~1950 kgf/cm², and more preferably 1600~1800 kgf/cm²; a horizontal tensile strength of preferably 300~657 kgf/cm², and more preferably 400~600 kgf/cm²; and a longitudinal high-temperature resistance (90°/2 h) of preferably 0.5~2.3%.

In the present invention, the step of subjecting the polypropylene microporous composite film to hydrophilic treatment includes:

soaking the polypropylene microporous composite film in the treating solution for the membrane separator of the battery for 1-5 hours, and drying. The treating solution for the membrane separator of the battery includes the following components by weight percentage: 1.85 wt %~2 wt % fluoro-carbon surfactant; 1.3 wt %~1.5 wt % leveling agent; 1.4 wt %~1.7 wt % non-ion surfactant; and 95 wt %~95.4 wt % water. The drying temperature is preferably 30~80° C., and more preferably 30~70° C. The drying process includes: after soaking the polypropylene microporous composite film in the treating solution for the membrane separator of the battery for 1-5 hours, baking the polypropylene microporous composite film in a horizontal drying device having four temperature zones of 70° C., 60° C., 45° C., and 30° C., respectively. In addition, the treatment after the hydrophilic treatment includes: coiling up the membrane separator of the battery, preferably by using a driven bearing.

The polypropylene microporous composite film and the treating solution for the membrane separator have an area/mass ratio of preferably (30 m²~50 m²):(20 Kg~30 Kg), more preferably (35 m²~45 m²):(22 Kg~28 Kg), more preferably 40 m²:25 Kg. Upon the hydrophilic treatment, the polypropylene microporous composite film is increased in weight by preferably 2.3~4.5 g/m², more preferably 2.5~4.2 g/m², and most preferably 2.8~4 g/m².

The fluoro-carbon surfactant is preferably INTECHEM-01 fluoro-carbon surfactant. It is an alkyl ether anion surfactant, having many of the excellent properties of anion and non-ion surfactants and capable of greatly reducing the surface tension of the electrolyte solution. Moreover, the surfactant is a low foaming surfactant, facilitating observing the wetting of the film. In the treating solution for the membrane separator of the battery, the content of the fluoro-carbon surfactant is preferably 1.88 wt %~1.95 wt %, more preferably 1.9 wt %~1.92 wt %, and most preferably 1.903 wt %.

The leveling agent used in the present invention is preferably wetting leveling agent, and more preferably KY-1028A wetting leveling agent. It is a polyether-modified organo-silicone, and has good anti-cratering performance and good effect in reducing the tension of the solution, so that the treating solution for the membrane separator of the battery can be uniformly distributed on the surface of the polypropylene microporous composite film. In the treating solution for the membrane separator of the battery, the content of the leveling agent is preferably 1.3 wt %~1.45 wt %, more preferably 1.32 wt %~1.4 wt %, and most preferably 1.343 wt %.

The non-ion surfactant is preferably FCNTACARE-1202 non-ion surfactant. It can provide abundant hydrophilic functional groups on the surface of the polypropylene microporous composite film and the surface of the micropores, playing an important role in the wetting and liquid absorption of the polypropylene micro-pores. In the treating solution for the membrane separator of the battery, the content of the non-ion surfactant is preferably 1.45 wt %~1.6 wt %, more preferably 1.5 wt %~1.55 wt %, and most preferably 1.523 wt %.

The present invention further provides a method for preparing a treating solution for a membrane separator of a battery, including the steps of:

adding 1.4 wt %~1.7 wt % non-ion surfactant to 95 wt %~95.4 wt % water, and mixing to provide a first solution; and separately Adding 1.85 wt %~2 wt % fluoro-carbon surfactant and 1.3 wt %~1.5 wt % leveling agent to the first solution, and mixing to provide the treating solution for the membrane separator of the battery.

Further, the present invention preferably includes preheating the water to a temperature of preferably 50~70° C., and more preferably 60° C.

In the step of proving the first mixed solution, the mixing is performed preferably by agitating, at a speed of preferably 2~10 rad/1 s and more preferably 3~5 rad/1 s, preferably for 10~30 min, and more preferably for 15 min. In the step of providing the treating solution for the membrane separator of the battery, the mixing is performed preferably by agitating, at a speed of preferably 1~2 rad/1 s and more preferably 1.5~1.7 rad/1 s, preferably for 50~100 min, and more preferably for 60~80 min.

The membrane separator of the battery prepared according to the present invention can be evaluated for its liquid-absorption ratio, material loading mount, surface resistance, and the like by the methods well-known by those skilled in the art. The results showed that the membrane separator of the battery prepared according to the present invention meet the requirements for a nickel-zinc battery.

For the purpose of further explaining the technical solution of the present invention, the preferred embodiments of the present invention will be described in combination with the following examples. However, it is should be noted that those descriptions are made simply for further explaining the features and advantages of the present invention, rather than making a limitation to the claims of the present invention.

The chemical agents used in the examples of the present invention are all commercially available.

EXAMPLE 1

Preparing the treating solution for the membrane separator of the battery:

weighing 95.23 g H₂O and preheating to 60° C.;

adding 1.523 g FCNTACARE-1202 non-ion surfactant to the preheated H₂O, and agitating at 3 rad/1 s for 15 min to provide the first solution;

adding 1.904 g INTECHEM-01 fluoro-carbon surfactant and 1.343 g KY-1028A wetting leveling agent to the first solution, agitating at 1.7 rad/1 s for 7.5 min and then magnetically agitating at 1.5 rad/1 s for 70 min to provide the treating solution for the membranes separator of the battery.

Preparing the polypropylene microporous composite film:

drawing the first polypropylene film in one direction at −4° C., and keeping it at 50° C. for 1 hour to provide a first polypropylene microporous film having a thickness of 0.10 mm, an areal density of 15 g/m², an air permeability of 40%, a pore-area piercing strength of 1250 g, a longitudinal tensile strength of 1650 kgf/cm², a horizontal tensile strength of 480 kgf/cm², and a longitudinal high-temperature resistance (90°/2 h) of 0.5%; drawing a second polypropylene film that is same as the first polypropylene film in one direction at −4° C., keeping it at 50° C. for 1 hour to provide a second polypropylene microporous film having a thickness of 0.10 mm, an areal density of 15 g/m², an air permeability of 40%, a pore-area piercing strength of 1250 g, a longitudinal tensile strength of 1650 kgf/cm², a horizontal tensile strength of 480 kgf/cm², and a longitudinal high-temperature resistance (90°/2 h) of 0.5%; and perpendicularly compounding the first polypropylene microporous film and the second polypropylene microporous film at 75° C. by using a rolling device having a diameter of 500 mm and a length of 700 mm to provide the polypropylene microporous composite film.

Preparing the membrane separator of a battery:

placing the polypropylene microporous composite film prepared in the above treating solution for membrane separator of battery at room temperature, standing for 2 hours, and drying in a horizontal drying device having four temperature zones of 70° C., 60° C., 45° C., and 30° C. to provide the membrane separator of the battery, in which the polypropylene microporous composite film and the treating solution for the membrane separator of the battery have an area/mass ratio of 40 m²:25 Kg.

Figure 3:
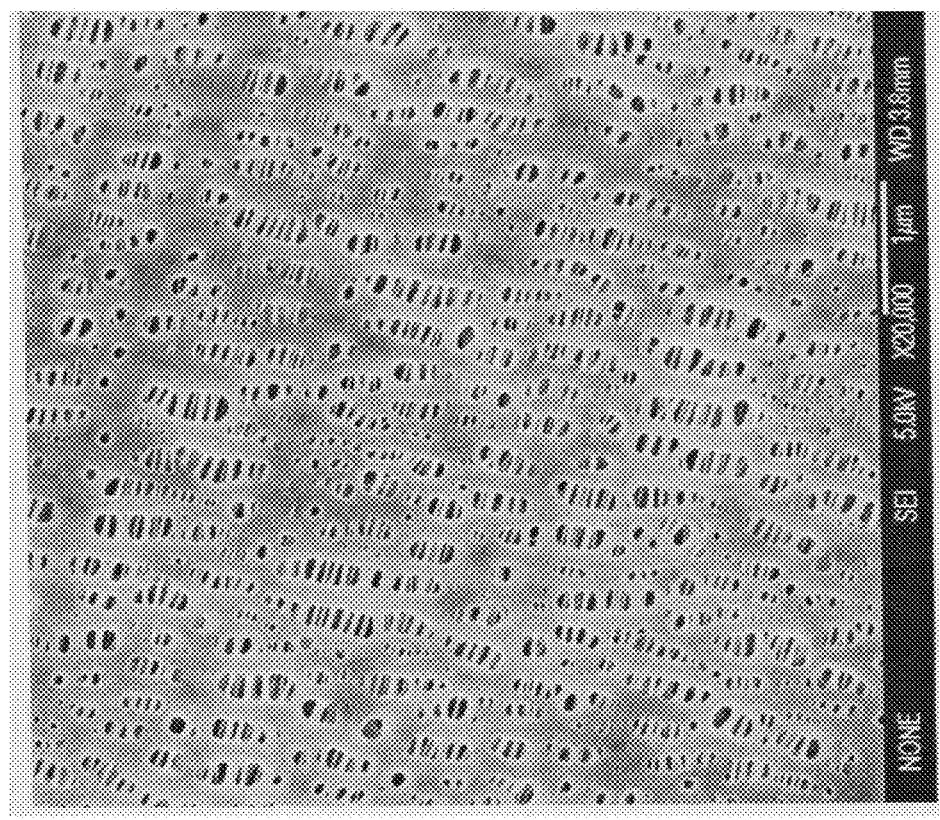
FIG. 3 is the scanning electron microscope image of the membrane separator of a battery prepared in example 1 of the present invention.

FIG. 3 shows the SEM image of the membrane separator of the battery prepared according to the first example.

The membrane separator of a battery prepared according the example is evaluated for its liquid absorption rate, providing a result of 180%. The polypropylene microporous composite film and the membrane separator are weighed, finding out a weight increase of 4 g/m² for the polypropylene microporous composite film.

The surface resistance of the membrane separator of the battery prepared according to the example is determined by the following steps:

cutting the membrane separator of battery prepared according to the example into 5 pieces of equal size, soaking in a KOH solution having a mass concentration of 30% to provide a first testing sample, a second testing sample, a third testing sample, a forth testing sample, and a fifth testing sample.

TH2810B type LCR digital electric bridge as the surface resistance tester for the membrane separator, which operates as follows: supplying 120V alternate current, switching on the tester and standing at 20° C.=5 for 15 minutes; connecting the HP and HS interfaces of the output ports in parallel, to server as the positive electrode output terminal; connecting the LS and LP interfaces of the output ports in parallel, to server as the negative electrode output terminal; switching the measuring grade to mΩ grade; switching the switch to "zero clearing" grade; switching the parameter grade to "RQ" grade; switching the testing frequency to "1 KHZ"; switching the display window to "directly reading"; connecting the positive electrode terminal and the negative electrode terminal to the nickel plates on both sides of the alkali solution tank, respectively; respectively sandwiching the first testing sample, the second testing sample, the third testing sample, the forth testing sample, and the fifth testing sample between two clamping plates with a hole, immersing and fixing the whole clamping plates in the alkali solution tank; and pouring 1.3 g/ml KOH solution into the alkali solution tank. The test showed that the membrane separator of the battery prepared according to the present example has an internal resistance of 0.017~0.035 mΩ/cm².

EXAMPLE 2

The membrane separator of a nickel-zinc battery produced by Guangdong Power Link Ltd. Corp. was replaced with the membrane separator prepared according to the example 1, and then the nickel-zinc battery with the replaced membrane separator was charged for 100 hours. No dendrite penetration was observed for the membrane separator of the battery.

EXAMPLE 3

Preparing the treating solution for the membrane separator of the battery:

weighing 95.23 g $H_2O$ and preheating to 60° C.;

adding 1.523 g FCNTACARE-1202 non-ion surfactant to the preheated $H_2O$, and agitating at 3 rad/1 s for 15 min to provide the first solution;

adding 1.904 g INTECHEM-01 fluoro-carbon surfactant and 1.343 g KY-1028A wetting leveling agent to the first solution, agitating at 1.7 rad/1 s for 7.5 min and then magnetically agitating at 1.5 rad/1 s for 70 min to provide the treating solution for the membranes separator of the battery.

Preparing the polypropylene microporous composite film:

drawing the first polypropylene film in one direction at −6° C., and keeping it at 55° C. for 1 hour to provide a first polypropylene microporous film having a thickness of 0.12 mm, an areal density of 28 g/m², an air permeability of 45%, a pore-area piercing strength of 1480 g, a longitudinal tensile strength of 1720 kgf/cm², a horizontal tensile strength of 500 kgf/cm², and a longitudinal high-temperature resistance (90°/2 h) of 1.7%; drawing the second polypropylene film that is same as the first polypropylene film in one direction at −6° C., keeping it at 55° C. for 1 hour to provide a second polypropylene microporous film having a thickness of 0.12 mm, an areal density of 28 g/m², an air permeability of 45%, a pore-area piercing strength of 1480 g, a longitudinal tensile strength of 1720 kgf/cm², a horizontal tensile strength of 500 kgf/cm², and a longitudinal high-temperature resistance (90°/2 h) of 1.7%; and perpendicularly compounding the first polypropylene microporous film and the second polypropylene microporous film at 75° C. by using a rolling device having a diameter of 500 mm and a length of 700 mm to provide the polypropylene microporous composite film.

Preparing the membrane separator of the battery:

placing the prepared polypropylene microporous composite film in the above treating solution for membrane separator of battery at room temperature, standing for 2 hours, and drying in a horizontal drying device having four temperature zones of 70° C., 60° C., 45° C., and 30° C. to provide the membrane separator of the battery, in which the polypropylene microporous composite film and the treating solution for the membrane separator of the battery have an area/mass ratio of 40 m²:25 Kg.

The properties of the membrane separator of the battery prepared in example 3 is tested by the same method as in example 1, which gives a liquid absorption rate of 170%, a weight increase of 3.5 g/m², and a surface resistance of 0.022~0.028 mΩ/cm².

EXAMPLE 4

The membrane separator of a nickel-zinc battery produced by Guangdong Power Link Ltd. Corp. was replaced with the membrane separator prepared according to the example 3, and then the nickel-zinc battery with the replaced membrane separator was charged for 100 hours. No dendrite penetration was observed for the membrane separator of the battery.

The above description to the embodiments as disclosed is made so that those skilled in the art can carry out or utilize the present invention. It is obvious that various modifications to these examples can be made by those skilled in the art. The general principle defined herein can be carried out in other embodiments, without departing from the spirit or scope of the present invention. Therefore, the present invention will not be limited to those embodiments illustrated in the description, and on the contrary, will be defined by the broadest scope complying with the principle of the present invention and consistent with the novel features.

What is claimed is:

1. A method for preparing a membrane separator of a battery, comprising the steps of:

separately drawing a first polypropylene film and a second polypropylene film in one direction at −3-7° C., and maintaining the films at 45-60° C. to provide a first polypropylene microporous film and a second polypropylene microporous film;

perpendicularly compounding the first polypropylene microporous film and the second polypropylene microporous film along the drawing direction to provide a polypropylene microporous composite film; and subjecting the polypropylene microporous composite film to hydrophilic treatment to provide the membrane separator of the battery by soaking the polypropylene microporous composite film in a treating solution for the membrane separator of the battery for 1-5 hours, and drying, wherein the treating solution for the membrane separator of the battery comprises the following components by weight percentage: 1.85 wt %-2 wt % fluoro-carbon surfactant; 1.3 wt %-1.5 wt % leveling agent; 1.4 wt %-1.7 wt % non-ion surfactant; and 95 wt %-95.4 wt % water.

2. The method according to claim 1, characterized in that the polypropylene microporous composite film and the treating solution for the membrane separator of the battery have an area/mass ratio of (30 m$^2$-50m$^2$):(20 Kg-30 Kg).

3. The method according to claim 1, characterized in that the polypropylene microporous composite film has a thickness of 0.015-0.10 mm.

4. The method according to claim 1, characterized in that the polypropylene microporous composite film has an areal density of 12-43 g/m$^2$, and an air porosity of 35-56%.

5. The method according to claim 1, characterized in that the polypropylene microporous composite film has a puncture resistance of 8-50N.

6. The method according to claim 1, characterized in that the polypropylene microporous composite film has a longitudinal tensile strength of 1500-1950 kgf/cm$^2$, and a horizontal tensile strength of 300-657 kgf/cm$^2$.

7. The method according to claim 1, characterized in that the first polypropylene microporous film has a pore size of 7~15 μm; and the second polypropylene microporous film has a pore size of 7~15 μm.

* * * * *